(12) United States Patent
Haslem et al.

(10) Patent No.: US 7,722,739 B2
(45) Date of Patent: May 25, 2010

(54) PORTABLE EVAPORATION CHAMBER

(75) Inventors: Darrin Niles Haslem, Yorktown, VA (US); Michael Talmadge Lawing, Yorktown, VA (US)

(73) Assignee: Evaporite Systems, Inc., Yorktown, VA (US)

( * ) Notice: Subject to any disclaimer, the term of this patent is extended or adjusted under 35 U.S.C. 154(b) by 956 days.

(21) Appl. No.: 11/277,901

(22) Filed: Mar. 29, 2006

(65) Prior Publication Data
US 2007/0235146 A1    Oct. 11, 2007

(51) Int. Cl.
*B01D 1/16* (2006.01)
*B01D 1/20* (2006.01)
*B05B 1/14* (2006.01)
*B05B 15/06* (2006.01)

(52) U.S. Cl. .................... 159/4.07; 159/34; 159/42; 159/16.1; 159/48.1; 159/DIG. 40; 202/83; 202/236; 202/266; 239/200; 239/462; 239/556; 239/DIG. 23

(58) Field of Classification Search ............... 159/4.01, 159/4.07, 34, 42, 16.1, 48.1, DIG. 40, DIG. 41; 202/83, 236, 266; 239/200, 462, 556, DIG. 23
See application file for complete search history.

(56) References Cited

U.S. PATENT DOCUMENTS

| | | | |
|---|---|---|---|
| 3,629,955 A * | 12/1971 | Davis et al. ................... 34/174 |
| 4,449,849 A | 5/1984 | Horn et al. | |
| 4,649,655 A | 3/1987 | Witten | |
| 4,713,172 A * | 12/1987 | Horn et al. ................... 210/150 |
| 4,741,803 A * | 5/1988 | Loeffelmann ............... 159/4.04 |
| 4,762,276 A | 8/1988 | Foust | |
| 4,828,717 A * | 5/1989 | DeLeeuw et al. ........... 210/740 |
| 4,869,810 A | 9/1989 | Ellingsen et al. | |
| 4,973,387 A * | 11/1990 | Osterman et al. ............. 203/39 |
| 5,352,276 A * | 10/1994 | Rentschler et al. ........... 95/246 |
| 6,190,498 B1 * | 2/2001 | Blagborne ................. 159/4.01 |
| 6,299,735 B1 | 10/2001 | Lumbreras | |
| 7,604,710 B2 * | 10/2009 | Haslem et al. ................. 159/3 |
| 2001/0011631 A1 * | 8/2001 | Lumbreras ................... 203/10 |
| 2005/0022989 A1 | 2/2005 | Heins | |
| 2008/0283623 A1 * | 11/2008 | Haslem et al. ................. 239/1 |

* cited by examiner

*Primary Examiner*—Virginia Manoharan
(74) *Attorney, Agent, or Firm*—Miller, Matthias & Hull (57) ABSTRACT

A self-contained evaporation system for use in disposing of excess water from oil and gas drilling operations is provided. The system includes a water holding tank in which the wastewater is preheated, an evaporation chamber mounted over the holding tank and having an open top, a nozzle system located within the chamber for producing a fine liquid mist, and fans disposed within the chamber for producing an air flow that carries the mist out the open top of the chamber. The system can be set up and taken down by one person in an hour or less, can be used with pond or tank operations, and is capable of operating in high winds and sub-zero temperatures. The system can be carried and mounted on a trailer for easy transport to and from various drilling sites.

6 Claims, 6 Drawing Sheets

PORTABLE EVAPORATION CHAMBER

BACKGROUND

1. Field of the Invention

This patent relates to an apparatus for evaporating waste liquids. More particularly, this patent relates to a portable evaporation chamber for use in disposing of wastewater from oil and gas drilling and production operations.

2. Description of the Related Art

In most oil and gas drilling operations, drilling fluid or mud is used to remove drill cuttings from the borehole. The drilling fluid is usually a mixture of clays, chemicals, weighting material and water or oil. The drilling fluid generally is pumped from a mud pit to a standpipe, through a kelly hose to a swivel, through the kelly and down into the drill string to the bit. From there the fluid and cuttings flow back up the annular space around the drill string to a mud return line. From the return line the fluid passes across a shaker where the cuttings are removed and on to a reserve or pond. The pond is used to collect the excess water. Water production can continue throughout the life of the well.

The problem with this arrangement is that the collected water in the pond must be disposed of. Various evaporation systems have been devised to accomplish this task. Typically, these systems involve spraying the water into the air using high-pressure pumps and nozzle arrays that maximize the surface area of the water droplets in order to increase evaporation rates. Many of the evaporation systems are designed to evaporate the water while floating over the wastewater pond to minimize ground saturation.

These evaporation systems have several disadvantages. First, they cannot operate in high winds or extreme cold weather. Second, the mist still allows for ground saturation in areas of sustained winds which requires system shutdown. Third, these systems can be cumbersome to set up, maintain and move. Fourth, these evaporation systems are limited to impoundment pond operations. Once a drilling site has been reclaimed, the excess water ends up in a storage tank which current evaporation systems cannot access.

Thus it is an object of the present invention to provide a water evaporation system useful in oil and gas drilling operations that is easy to set up and tear down, is capable of operating in windy or sub-zero temperatures, and can be used with pond or tank operations.

Another object of the invention is to provide a water evaporation chamber that can be set up on ground near a pond or tank, and in which wastewater is atomized into 300 micron or smaller water droplets that can be carried out through the top of the evaporation chamber and evaporated in the surrounding atmosphere.

Yet another object of the present invention to provide a wastewater evaporation system that can be operated by one person.

Further and additional objects will appear from the description, accompanying drawings, and appended claims.

SUMMARY OF THE INVENTION

The present invention fulfills these objectives by providing a unique evaporation system for use in disposing of excess water from oil and gas drilling operations. The system comprises a water holding tank mounted on a wheeled trailer, an evaporation chamber mounted over the holding tank and having an open top, a nozzle system located within the chamber, a pump for pumping water from the holding tank to the nozzle system, and one or more fans disposed near the bottom of the chamber for producing a hot air flow that can carry a liquid mist out of the chamber open top. Heating units mounted around the water holding tank, heating coils within the tank, and engine exhaust piping extending around and sometimes within the water holding tank help raise the water temperature to enhance evaporation.

The chamber preferably comprises a solid walled lower portion and tarp-like upper portions attached to the lower portion and suspended from a solid frame. The solid frame is telescopically mounted to the trailer so that the tarp-like upper portions can be collapsed for easy transport. The wheeled trailer has a number of stabilizing jacks which can be extended outward from the trailer for better stability when the system is in use.

The nozzle system comprises one or more vertically arranged manifolds, each supporting an array of laterally aimed nozzles that spray water through impact screens located in front of the nozzles. The nozzles and screens produce a liquid mist that can be carried up and out the open top of the chamber by a hot air stream. In one embodiment the nozzles and screens are capable of producing atomized droplets having a diameter of about 150 microns. Baffles mounted in front of the hot air fans insure that the upwardly directed air does not interfere with the atomization of the spray mist exiting the impact screens.

BRIEF DESCRIPTION OF THE DRAWINGS

FIG. 1 is a perspective cutaway view of one embodiment of a portable, trailer-mounted evaporation chamber according to the present invention shown in the raised (operating) position.

FIG. 2 is a perspective view of the holding tank used in the present invention.

FIG. 3 is a perspective cutaway view of the trailer of FIG. 1 shown in the lowered (non-operating) position.

FIG. 4 is a perspective view of the interior of the evaporation chamber of FIG. 1 showing the travel of water from the water holding tank through the flexible piping to the three nozzle manifolds positioned within the evaporation chamber. FIG. 4 also shows the flow of air up through the chamber interior.

FIG. 4*a* is a side view of a nozzle manifold of the present invention, showing the flow of water and air through the chamber.

FIG. 5 is a perspective cutaway view the portable evaporation chamber of FIG. 1, showing the downwardly extending masts that help position the lower two manifolds.

FIG. 6 is a perspective cutaway view of a second embodiment the trailer of FIG. 1 shown in the lowered (non-operating) position, one in which the water is preheated by generator exhaust pipes that extend within the water holding tank.

DETAILED DESCRIPTION OF THE INVENTION

Turning to the drawings, there is shown in FIG. 1 one embodiment of the present invention, a portable water evaporation system 10 for use in disposing of excess water from oil and gas drilling and production operations and in other applications. The system 10 comprises a water-tight water holding tank 12 mounted on a wheeled trailer 14 and a large evaporation chamber 16 mounted over the holding tank 12. As will be explained in more detail below, water is pumped from a source (e.g., a settling pond or wastewater tank) to the holding tank 12 by a transfer pump (not shown), then pumped from the holding tank 12 through nozzles 74 located inside the chamber 16 to create a mist that is carried by a heated air flow out the open top 55 of the chamber 16.

The system 10 is self contained and capable of being towed by a three-quarter ton pickup over rough terrain. When opened (raised), the system 10 stands about thirty feet high from the ground, about eight feet wide and twenty feet long, not including a fifth wheel towing package. The overall weight of the system 10 is approximately 8,000 pounds, including the trailer 14.

Figure 2:
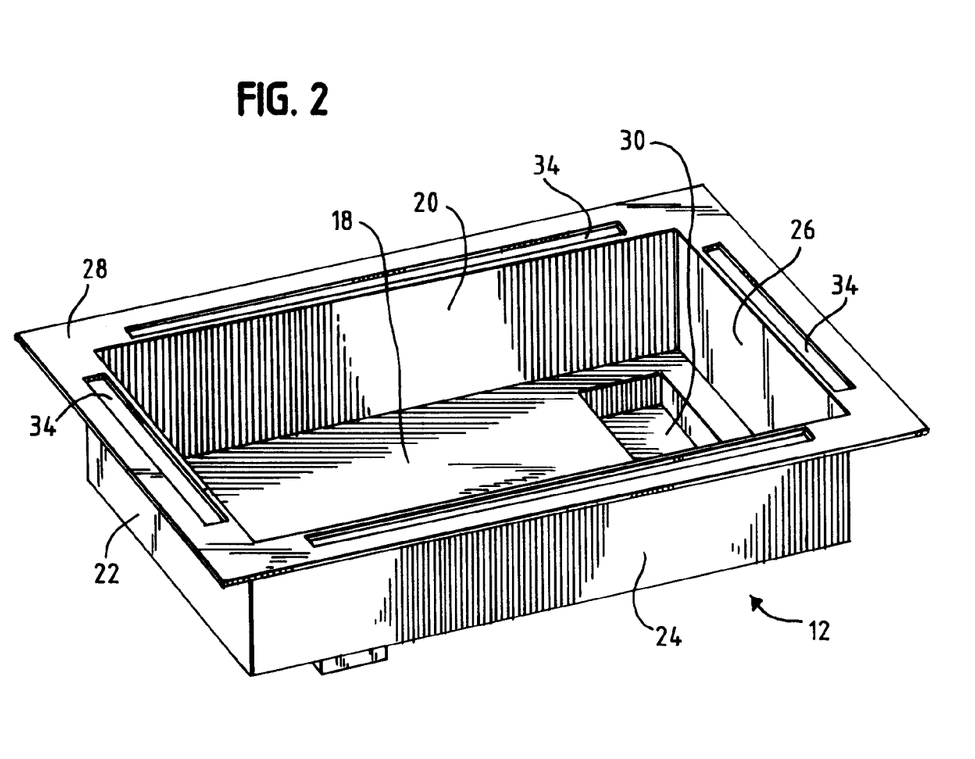

FIG. 2 is a perspective view of the holding tank 12. The holding tank 12 is designed to hold a maximum of five barrels (210 gallons) of water, and comprises a bottom 18, sides 20, 22, 24 and 26, and a flange 28 that extends horizontally outward from the top of the sides. The flange 28 includes longitudinal slots 34 disposed therein to accommodate air being blown into the chamber 16 by curtain fans 80 as explained further below. Preferably, the tank 12 is mounted to the trailer bed at a slight angle so that the wastewater flows to a depression 30 built into the bottom 18 of the tank 12.

One or more high pressure submersible pumps 32 (FIGS. 3 and 4) are set in the depression 30 so that the pump(s) 32 can pump a maximum amount of water from the tank 12 before shutting down. A heating system comprising a heater (not shown) that heats an oil based heating fluid that circulates through an extensive array of metal tubing surrounding the draw (intake side) of the submersible pump 32 preheats the water before it is pumped to the nozzle system 70. The heater tubing may be copper or aluminum, depending on the pH of the water.

The water level within the holding tank 12 may be regulated to within about two inches by an automatic flow restrictor (not shown). Preferably the system 10 is equipped with an automatic shut-down mechanism and an additional transfer pump to pump water back to the pond or settling tank in the event the water level within the holding tank 12 exceeds a certain level.

The trailer 14 comprises a rectangular bed or base 38 mounted on two sets of wheels 40, a tow bar assembly 44 extending forward from the base 38, and stabilizer jacks 46 attached to the base 38 which can be extended outward and positioned on the ground for better stability when the system 10 is in use. Electrically controlled telescoping masts 42 extend upward from the four corners of the bed 38 to raise and support the evaporation chamber 16 as explained below. The entire system 10, including the trailer 14 and wheels 40, can be lifted up off the ground by the jacks 46.

In the preferred embodiment shown in the figures, the chamber 16 comprises three basic sections: a solid walled lower section 48, a middle section or lower tarp 50 and an upper section or upper tarp 52. The entire chamber 16 is supported by a structural framework preferably made from aluminum and comprising the telescoping masts 42 and three support frames 56, 58, 60 affixed to the masts 42. A first rectangular support frame 56 is affixed to the masts 42 at a level approximately even with the top of the lower section 48. A second rectangular support frame 58 is affixed to the masts 42 at a level even with the top of the middle section or lower tarp 50, and a third rectangular support frame 60 is even with the top of the masts 42 and the top of the chamber 16.

The first support frame 56 is affixed to the top rim of the solid walled lower section 48. The lower tarp 50 extends from the first support frame 56 to the second support frame 58. The upper tarp 52 extends from the second support frame 58 to the third support frame 60. The top edge of the upper tarp 52 is attached to cross braces 62 on the third support frame 60 located inward from the masts 42. The top edge of the upper tarp 52 defines the opening 55 through which atomized water droplets can escape as described below.

The solid walled lower section 48 of the chamber 16 is mounted onto or around the holding tank flange 28 such that the flange slots 34 communicate with the inside of the chamber 16. A door (not shown) may be located in the side of the solid walled lower section 48 to provide access into the chamber 16.

The electrically operated masts 42 raise and lower the tarps 50, 52. When in the raised position shown in FIGS. 1 and 5 the entire chamber 16 stands about 27 feet above the trailer bed 38, or about 30 feet above the ground. Locking pins lock the masts 42 in the raised position. The first support frame 56 does not raise and lower and is hard mounted to the masts about seven feet nine inches above the trailer bed 38. The second and third support frames 58, 60 raise and lower with the masts 42 and stand about twenty feet and twenty-seven feet above the trailer bed 38 respectively when the system 10 is in the raised position. When the masts 42 are lowered (FIG. 3), the resting height of the system 10 from the ground is about thirteen feet, including the approximately three foot high trailer 14.

Optional two inch aluminum exterior tension lines 64 run from the masts 42 at a height preferably at or above the second support frame 58 to points on the stabilizer jacks 46 distant the trailer base frame 18 to provide additional stability. The overall structure of the system 10, including the masts 42, support frames 56, 58, 60 and exterior tension lines 64 provide the stability to operate the evaporation chamber 16 in 40 knot sustained winds and 60 knot gusts.

Figure 1:
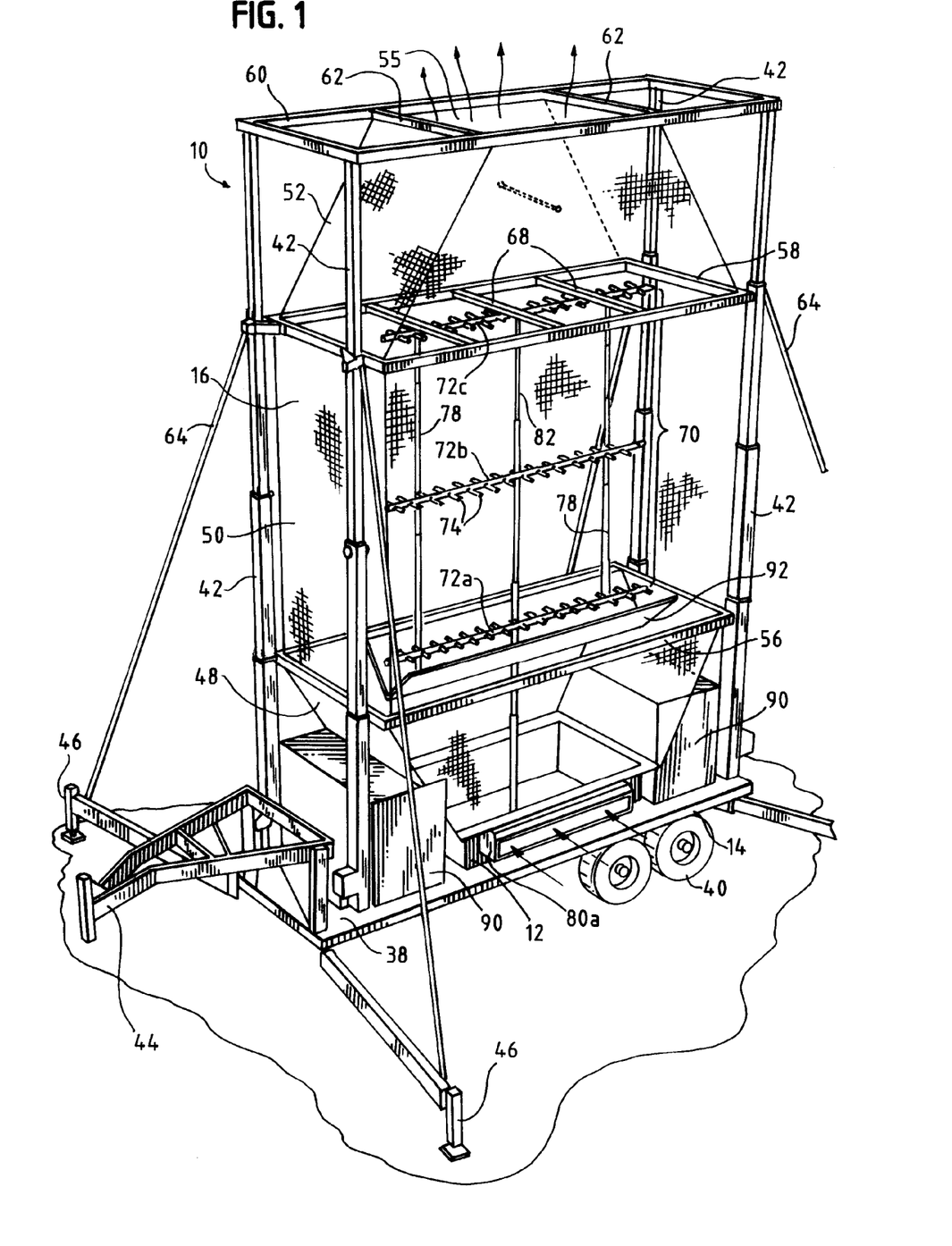
Figures 4, 4A:
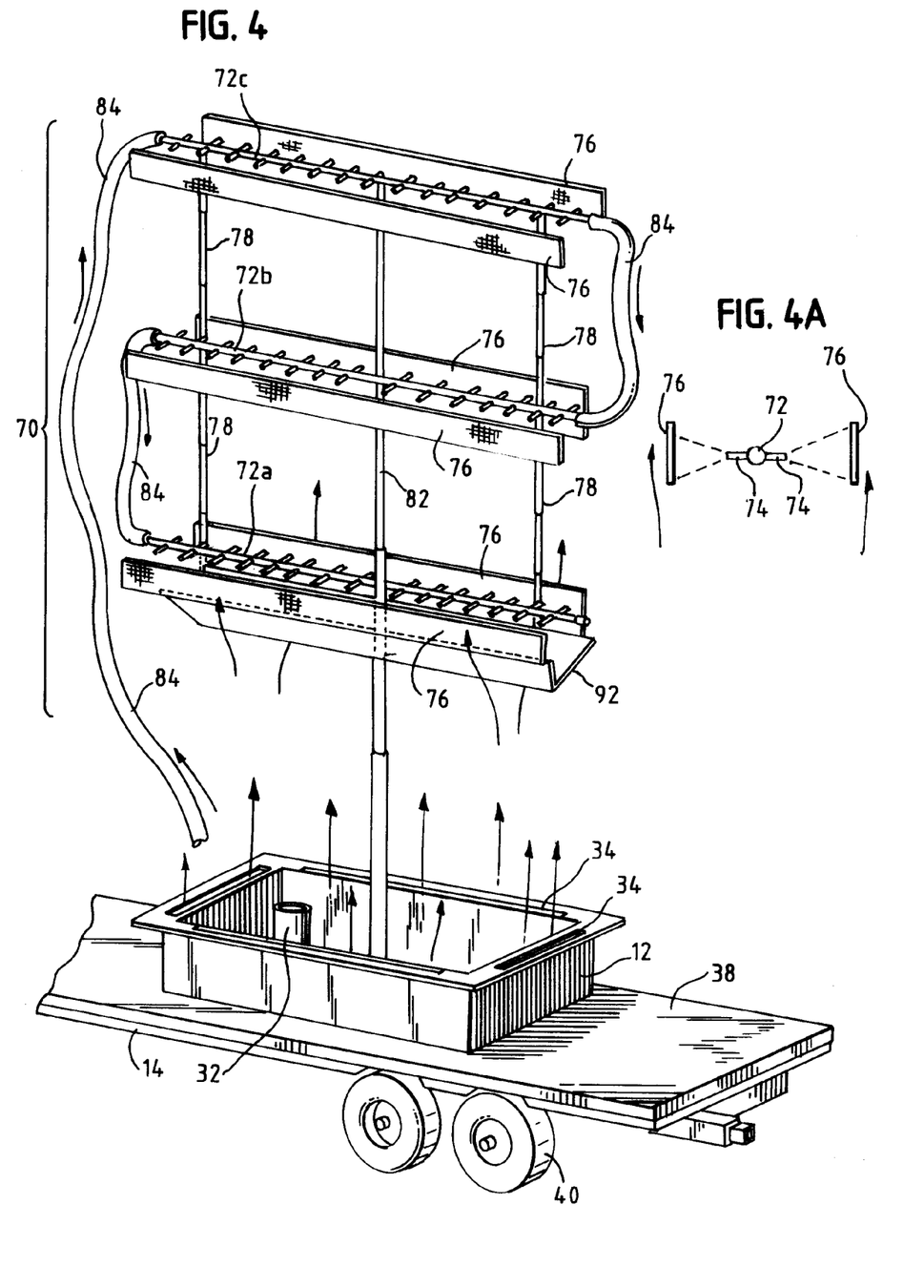
Figure 5:
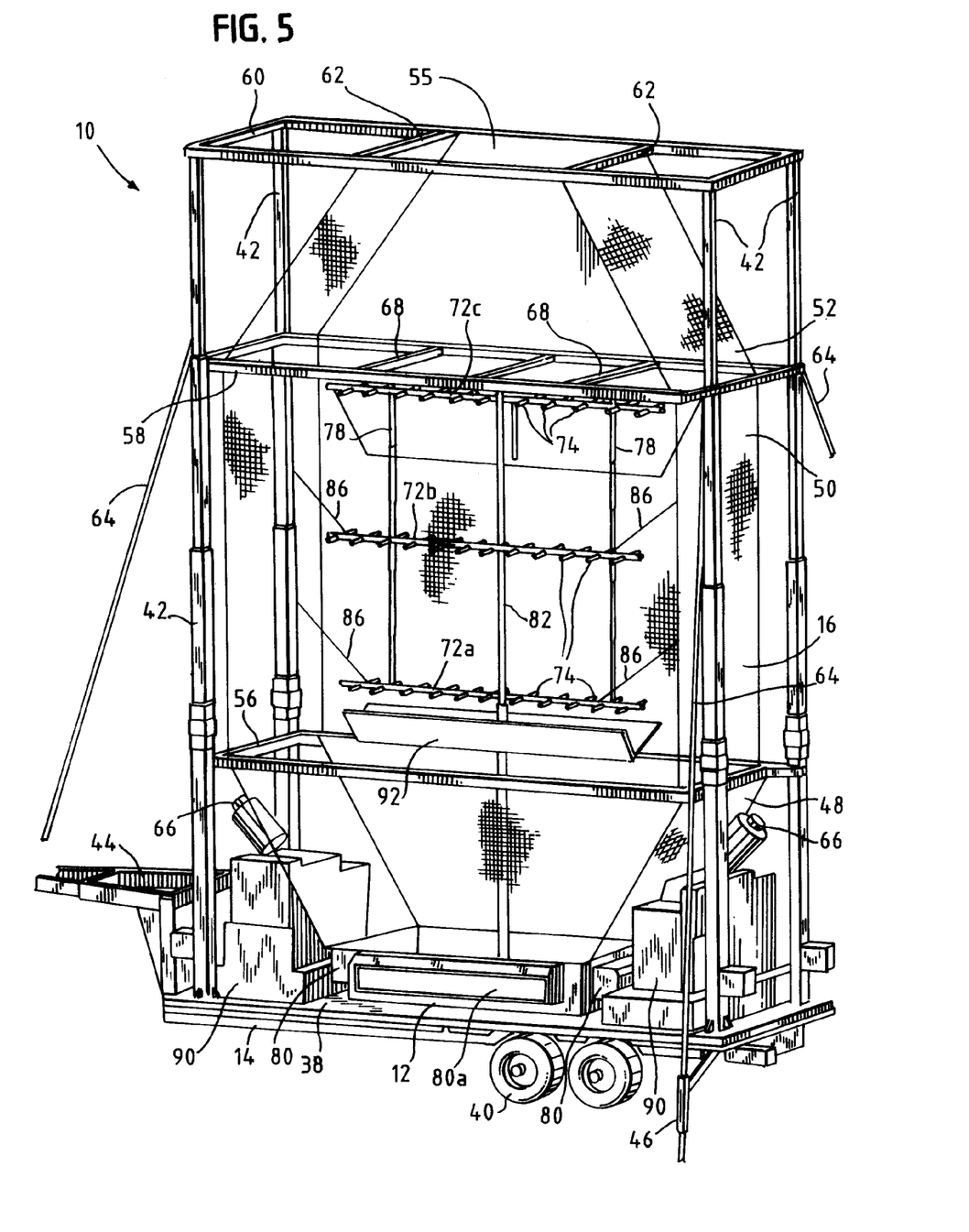

Referring to FIGS. 1, 4 and 5 and in particular FIG. 4, the chamber 16 houses an extensive nozzle system 70 designed for maximum flexibility in operation. The nozzle system 70 comprises one or more single pipe manifolds 72 with each manifold 72 carrying an array of outwardly and laterally aimed nozzles 74. In the embodiment illustrated in the figures three manifolds 72a, 72b and 72c are shown. The topmost manifold 72c is welded directly to the cross bars 68 of the second support frame 58. The lower two manifolds 72a and 72b are mounted to two downwardly telescoping masts 78 (FIG. 4) that allow the manifolds 72a, 72b to drop and separate to the positions shown in FIG. 4. Alternatively, the masts 78 may be hard mounted to the chamber floor and can use the waste water for hydraulic raising. A center telescoping mast 82 is attached to the bottom 18 of the water holding tank 14 and the topmost manifold 72c. This center mast 82 provides a lift assist to help take some of the drop weight off of the framing.

The manifolds 72 can carry the same or a different number of nozzles 74. As shown in FIG. 4, flexible piping 84 with quick connect couples and cam-locks runs from the submersible pump 32 to the topmost manifold 72c. Additional flexible piping 84 connects the topmost manifold 72c with the middle manifold 72b and the middle manifold 72b to the bottom manifold 72a.

As the chamber 16 is raised the manifolds 72 raise up from the telescoping supports 78 and become vertically spaced apart. When the manifolds 72 are fully raised the topmost manifold 72c is about twenty feet above the trailer bed 38 (about seven feet below the chamber open top 55) and the bottom manifold 72a is about 13'7" below the top manifold 72a (about 6'5" above the trailer bed 38). The manifold arrangement is designed to spray water the length of the major sides of the chamber 16.

When the chamber 16 is lowered (FIG. 3) the manifolds 72 collapse downward (are brought together), so the system 10 can be stored or moved. Optional internal flexible tension lines 86 (FIG. 5) run from the inside wall of the tarps 50, 52 to the manifolds 72 to provide inward tension on the tarps 50, 52 so they collapse inwardly when the chamber 16 is lowered.

Each manifold 72 preferably is made from two inch aluminum pipe with the nozzles 74 welded to the outside of the manifold 72. Each manifold 72 has a separate shut off valve (not shown in the figures). Only two manifolds 72 are in use during a typical operation. For a high water volume operation a third or even a fourth manifold 72 may be turned on (opened up) and a second submersible high pressure pump 32 may be added to the holding tank 12.

The nozzles 74 may be mounted in threaded bushings for interchangeability, thereby providing a total spray volume varying from about 84 gallons per minute (GPM) to over 400 GPM. All the nozzles 74 use a standard ¼" NPT thread size which allows the operator to quickly swap out nozzles of different sizes. The nozzles 74 spray substantially horizontally outward at up to over 100 PSI, forcing the water spray through a double set of stainless steel or aluminum impact screens 76 (see FIG. 4) which atomizes the water droplets. Each impact screen 76 is a single double-layered piece of expanded metal approximately twelve inches high and thirteen feet wide (about as long as the manifolds 72) and extends in front of a set of nozzles 74. Preferably the impact screens 76 are mounted by aluminum welds to horizontal braces which extend outward from the manifolds 72, and thus the screens 76 raise and lower with the nozzle manifolds 72. As the masts 42 are raised into place, they lift the support frames 58, 60, the manifolds 72 and the impact screens 76 at the same time.

Figure 3:
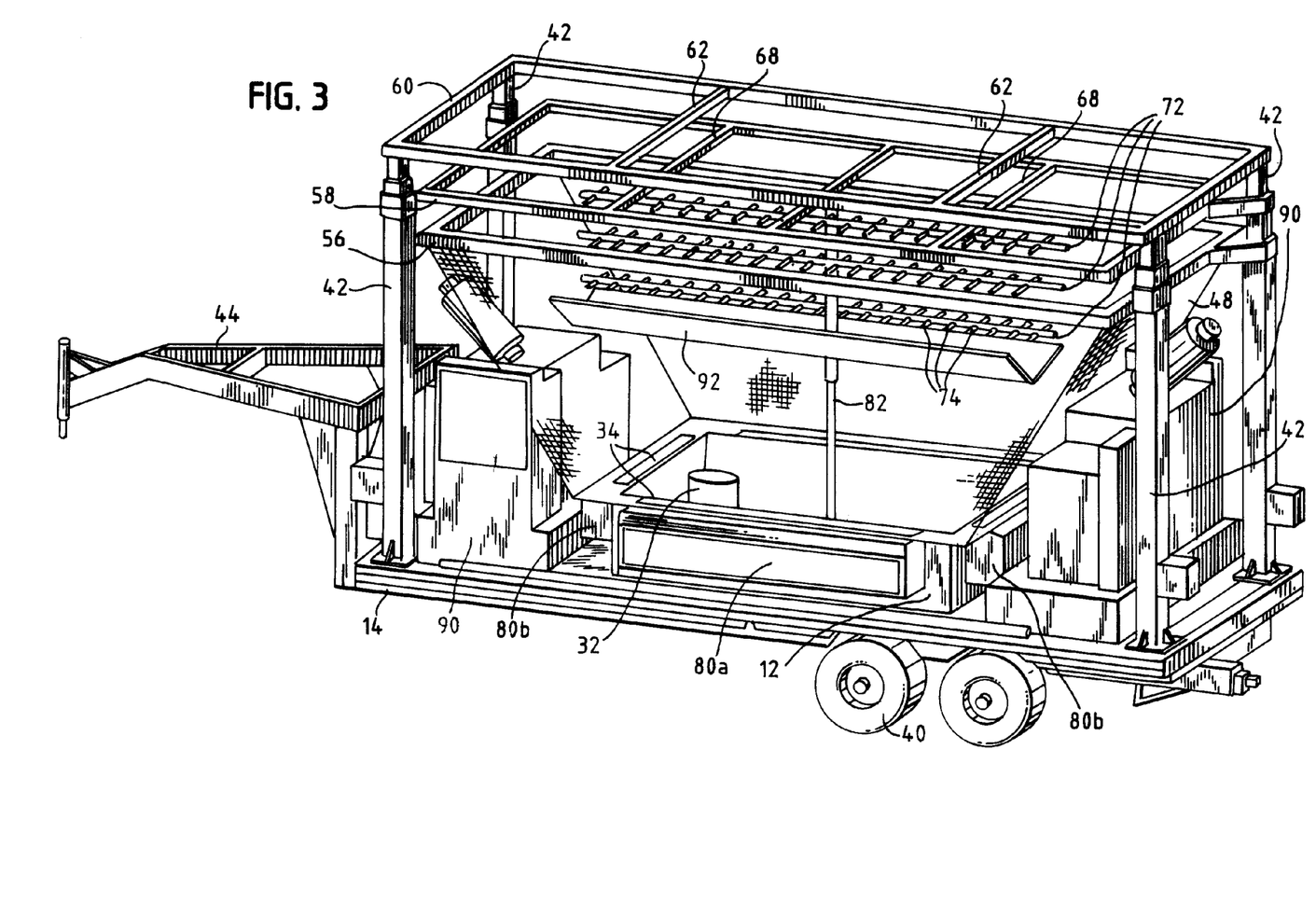

As the masts 42 are lowered, the nozzle system 70 and screens 76 collapse into the nested position shown in FIG. 3. The masts 42, 78 and 82 are retracted, the tarps 50, 52 (not shown) are lowered, and the three nozzle manifolds 72 are brought closer together substantially within the chamber lower section 48.

As shown in FIGS. 1, 3 and 5, four high capacity steel curtain fans 80 are mounted around the outside of the holding tank 12 to force heated air up through the slots 34 and along the inside walls of the chamber 16 in an upward direction roughly perpendicular to the direction of travel of the water droplets. The fans 80 include heaters which together are capable of producing over 200,000 BTUs of heat. The fans 80 are supported by throttle engines capable of turning the air over in the chamber 16 between two and eight times per minute. The two long fans 80a are about seven feet long and the two short fans 80b are about four feet long. Baffles (not shown) mounted inside the chamber 16 above the slots 34 in the path of the air flow insure that the air stays near the sides of the chamber 16 to help prevent interference with the atomization of the water droplets as they exit the impact screens 76.

As shown in FIG. 4 a V-shaped deflector plate 92 may be mounted to the masts 78, 82 below the lowest manifold 72a to deflect the rising air from the curtain fans 80 away from the nozzles, thus preventing the air flow from interfering with the nozzle spray before it hits the dispersing impact screens 76 and helping provide improved linear air flow up the sides of the chamber 16.

The system 10 need not evaporate all the mist within the chamber 16. Rather, the system 10 is intended to atomize the water to such a small diameter (about 150 microns) that the atomized water droplets that are blown out through the open top 55 of the chamber 16 and into the surrounding air where they evaporate before they have a chance to touch the ground in the form of water droplets. One way in which this task is accomplished is by increasing the height of the chamber 16 relative to the height of the nozzles 74 within the chamber 16.

We have found that extending the height of the chamber 16 to thirty feet, even though the highest nozzle manifold 72c is no higher than about twenty feet, allows for the atomized water mist to exit the chamber open top 55 while retaining the heavy water droplets within the chamber 16. The water mist exits the chamber 16 at a velocity of approximately 100 feet per second (or greater) and is so widely dispersed over the surrounding landscape as to mitigate any potential impact from the dissolved minerals (e.g. sodium) contained in the drilling production water.

The entire system runs off two 80 kW diesel generators 90 located at each end of the trailer bed 38. That is to say, electricity produced by the generators 90 runs the low pressure pump that carries water to the holding tank 12, the telescoping masts 42 that raise and lower the tarps 50, 52, the submersible pump(s) 32 that pump water to the nozzle system 70, the four high capacity fans 80 that heat and blow air up through the chamber 16, and the copper coil or aluminum heater that heats the water in the holding tank 12.

Figure 6:
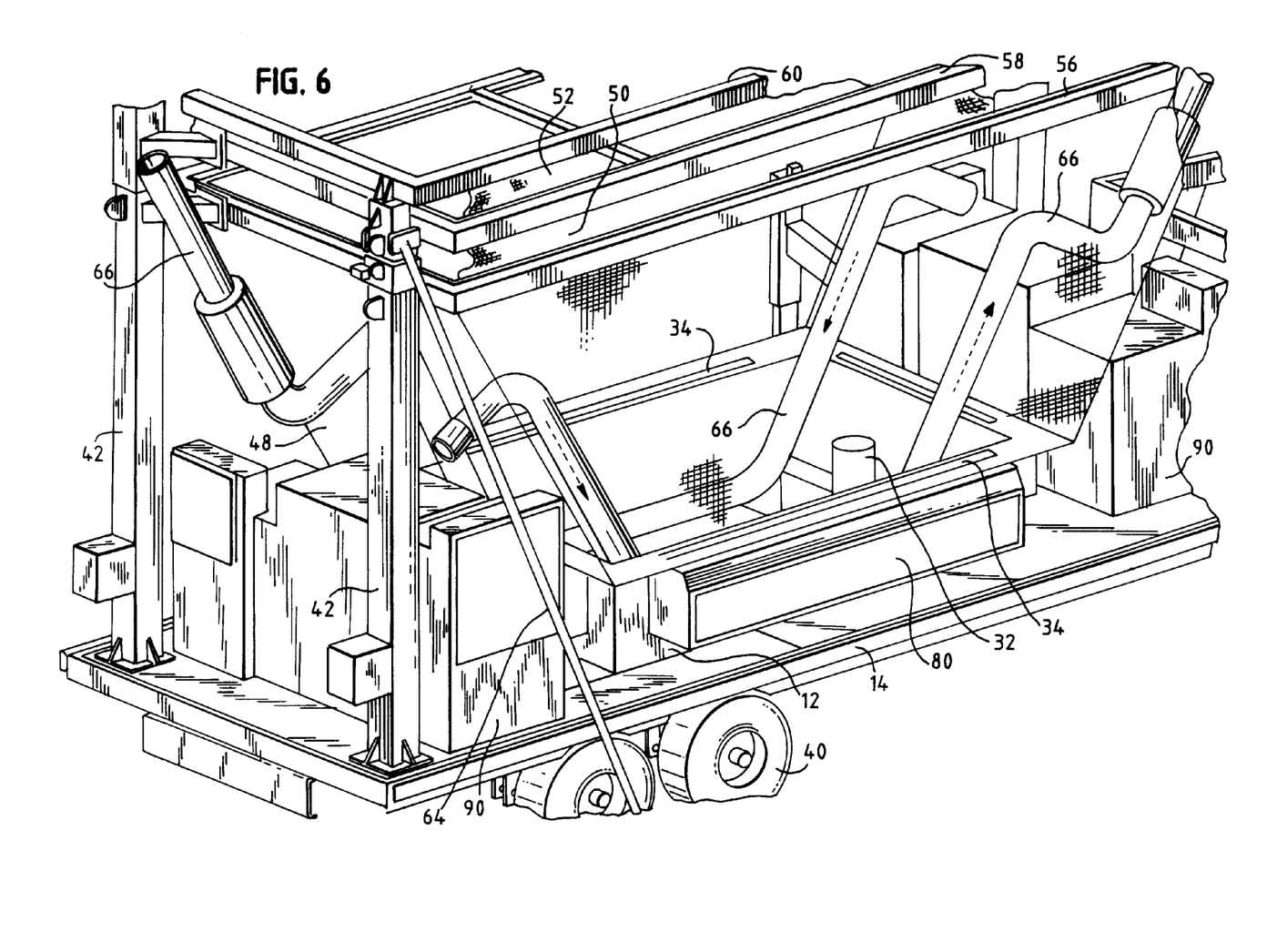

In the alternative embodiment shown in FIG. 6, the heating system for the water in the holding tank 12 and the air from the curtain fans 80 is supplemented with heat from the diesel generators 90. Exhaust from the generators 90 passes through conduit 66 that runs through the inside of the chamber lower section 48. In the illustrated embodiment, conduit running off of the exhaust line from each generator 80 passes through the chamber wall into the lower section of the chamber 16 to heat the air flowing upward from the curtain fans 80 and down into the water holding tank 12 to heat the waste water prior to its being pumped into the nozzle system 70. The conduit 66 that runs through the holding tank 12 will of course displace some of the water in the tank 12, perhaps as much as fifty gallons.

The invention works in the following manner. Wastewater is pumped from a holding pond or settling tank to the water holding tank 12 beneath the evaporation chamber 16 by a low-pressure pump (not shown in the figures) where the level of water in the tank 12 is regulated. The water in the holding tank 12 is heated by the coils surrounding the pump intake and, if used, the exhaust gases from the generators 90, raising the water temperature about 4-6 degrees F. or more. The submersible pump 32 located in the water holding tank depression 30 forces the water up through the flexible lines 84 into the manifolds 72 in sequential fashion and out through the horizontally oriented nozzles 74. Depending on the desired rate of water evaporation, one to three or more nozzle manifolds 72 will be open.

As shown in FIGS. 4 and 4a, water spray exits the nozzles 74 at up to 100 PSI or more and passes through the impact screens 76, creating a solid mist of water droplets having an average diameter of less than 300 microns, with less than or about 150 microns being preferred. After passing through the impact screens 76 the atomized droplets are moving in a substantially horizontal direction toward the chamber walls. At the same time, the curtain fans 80 located at the base of the chamber 16 force heated air up the interior space adjacent the chamber walls. The heated air carries the water mist up and out of the top 55 of the chamber 16 where it disperses and evaporates. Any water droplets that do not escape the chamber 16 fall back down into the holding tank 12 for recirculation. The system is capable of atomizing from about 84 to about 400 GPM of water. The evaporation process continues until the desired amount of water is completely dispersed into the air.

Thus there has been described a portable, self-contained, electrically powered, water-tight evaporation system 10 for use in disposing of excess water from oil and gas drilling and production operations. The system 10 comprises a water holding tank 12 in which the wastewater can be preheated, an evaporation chamber 16 mounted over the holding tank 12 and having an open top 55, a nozzle system 70 located within the chamber 16, a pump 32 for pumping water from the holding tank 12 to the nozzle system 70 and out through the nozzles 74 and then through impact screens 76, and one or more fans 80 located at the bottom of the chamber 16 for producing a heated air flow perpendicular to the flow of the atomized water droplets that carries the droplets out the open top 55 of the chamber 16. The system 10 can be set up and taken down by one person in an hour or less, can be used with pond or tank operations, and is capable of operating in high winds and sub-zero temperatures. The system 10 can be carried and mounted on a trailer 14 for easy transport to and from various drilling sites.

The system 10 uses a high capacity submersible pump 32 with high head strength for pumping water through the nozzle system 70. The water flow is restricted at each nozzle orifice to provide exceptional pressures upwards of 100 PSI or more and flow rates of 84 to 400 GPM.

It is understood that the embodiment of the invention described above is only one particular example which serves to illustrate the principles of the invention. Other modifications and alternative embodiments of the invention are contemplated which do not depart from the scope of the invention as defined by the foregoing teachings and appended claims. For example, more water heaters can be added to raise the temperature of the water in the holding tank 12. A gas heated coil array can be installed at the top 55 of the chamber 16 to help evaporate the mist escaping the chamber 16. A second pump set can be used to provide higher pump rates for freshwater ponds. This could be done by adding a second transfer pump to carry water to the holding tank 12 and another submersible pump 32. Finally, the size and configuration of the chamber 16 can be changed to increase or decrease the rate of water droplets escaping the chamber 16, including removing the top tarp 52 or making the open top 55 larger. It is intended that the claims cover all such modifications that fall within their scope.

We claim as our invention:

1. A system for evaporating liquid comprising:
   a liquid holding tank;
   a chamber comprising a solid walled lower section mounted above the liquid holding tank and an upper section mounted above the lower section, the upper section having an open top and comprising one or more tarps suspended from a solid frame;
   the solid frame comprising telescoping masts disposed around the outside of the chamber and first, second and third support frames affixed to the masts, the one or more tarps being attached to the second and third support frames such that the one or more tarps raise and lower with the masts;
   a nozzle system located within the chamber and comprising a plurality of vertically arranged linear nozzle manifolds including a topmost manifold, each manifold carrying a plurality of horizontally oriented nozzles, the topmost manifold being attached to the third support frame, each nozzle configured to produce a liquid spray;
   screens mounted to the manifolds in front of the nozzles;
   a pump for pumping liquid from the liquid holding tank to the nozzle system and out through the nozzles; and
   at least one fan disposed around the chamber below the nozzle system and capable of producing a substantially vertical air flow within the chamber that can move the liquid spray out of the chamber through the open top.

2. The system of claim 1 wherein the system is mounted on a wheeled trailer for easy transport.

3. The system of claim 1 wherein the nozzles are capable of producing liquid droplets having a diameter of about 150 microns.

4. The system of claim 1 wherein the pump is submersible and is located inside the liquid holding tank.

5. The system of claim 4 wherein the pump has an intake side and further comprising at least one heating element disposed within the liquid holding tank near the intake side of the pump.

6. The system of claim 1 wherein the chamber has sides and the air flow from the at least one fan is directed upward along the sides of the chamber.

\* \* \* \* \*